United States Patent
Melin

(10) Patent No.: US 11,740,085 B2
(45) Date of Patent: Aug. 29, 2023

(54) DEVICE AND A METHOD FOR DETECTION OF AND WARNING AGAINST TSUNAMIS

(71) Applicant: SEAWARD TSUNAMI ALARM AB, Näsviken (SE)

(72) Inventor: Sigurd Melin, Näsviken (SE)

(73) Assignee: SEAWARD TSUNAMI ALARM AB, Näsviken (SE)

(*) Notice: Subject to any disclaimer, the term of this patent is extended or adjusted under 35 U.S.C. 154(b) by 118 days.

(21) Appl. No.: 17/605,913

(22) PCT Filed: Apr. 22, 2020

(86) PCT No.: PCT/SE2020/050404
§ 371 (c)(1),
(2) Date: Oct. 22, 2021

(87) PCT Pub. No.: WO2020/218963
PCT Pub. Date: Oct. 29, 2020

(65) Prior Publication Data
US 2022/0214167 A1 Jul. 7, 2022

(30) Foreign Application Priority Data
Apr. 24, 2019 (SE) .................................. 1950499-2

(51) Int. Cl.
*G01C 13/00* (2006.01)
*G08B 21/10* (2006.01)
*G01L 11/00* (2006.01)

(52) U.S. Cl.
CPC ............ *G01C 13/002* (2013.01); *G01L 11/00* (2013.01); *G08B 21/10* (2013.01)

(58) Field of Classification Search
CPC .. G01C 13/006; G01C 13/004; G01C 13/002; G01C 13/00; G01C 13/008; G01C 5/06;
(Continued)

(56) References Cited

U.S. PATENT DOCUMENTS 4,408,488 A * 10/1983 Marshall .............. G01B 5/0002
441/32
6,558,216 B2 * 5/2003 Yerazunis .............. G08B 21/10
441/11
(Continued)

FOREIGN PATENT DOCUMENTS

CN 204390431 U * 6/2015
EP 2951617 B1 * 6/2021 ............... G01V 1/18
(Continued)

OTHER PUBLICATIONS

International Search Report for PCT/SE2020/050404 dated Jun. 15, 2020, 5 pages.
(Continued)

*Primary Examiner* — Andre J Allen
(74) *Attorney, Agent, or Firm* — Nixon & Vanderhye

(57) ABSTRACT

Disclosed is a method and device suitable for detection of and warning against tsunamis. The device is located in the water at sea. The device includes a vessel, a sensor for measuring a physical quantity of the surrounding water, a control unit inside the vessel and operatively connected to the sensor, and a communication element including a transmitter for communicating with an external receiver that the predetermined condition relating to the physical quantity is fulfilled. The device further includes a ballast tank inside the vessel. The interior of the ballast tank is connected to the outside of the vessel. A pump pumps water from the ballast tank to outside the vessel. The overall density of the device exceeds the density of the surrounding water when the ballast tank is filled, and is less than the density of the surrounding water when the ballast tank is empty of water.

20 Claims, 1 Drawing Sheet

(58) Field of Classification Search
CPC .......... G01C 17/34; G01C 21/16; G01C 5/04;
G01C 9/00; G01C 9/06; G01C 9/14;
G01C 9/18; G01C 21/185; G01C 9/12
USPC .......................................... 73/170.29–170.31
See application file for complete search history.

(56) References Cited

U.S. PATENT DOCUMENTS

| | | | |
|---|---|---|---|
| 8,019,546 B1* | 9/2011 | Osburn, III .......... | G01C 13/004 702/3 |
| 2008/0225643 A1 | 9/2008 | Vosburgh | |
| 2009/0207033 A1* | 8/2009 | Melin .................... | G01W 1/10 340/626 |
| 2013/0187787 A1 | 7/2013 | Damus et al. | |
| 2016/0047362 A1 | 2/2016 | Dunham et al. | |
| 2016/0157073 A1* | 6/2016 | Ishikawa ............... | G01C 13/00 455/404.1 |
| 2016/0234644 A1* | 8/2016 | Belghoul .............. | G01S 5/0236 |

FOREIGN PATENT DOCUMENTS

| | | |
|---|---|---|
| RU | 2 339 977 | 11/2008 |
| SE | 1500007-0 | 7/2006 |
| SE | 529 670 C2 | 10/2007 |
| WO | 2006/073358 A1 | 7/2006 |
| WO | WO-2020194560 A1 * | 10/2020 |

OTHER PUBLICATIONS

Written Opinion of the ISA for PCT/SE2020/050404 dated Jun. 15, 2020, 4 pages.

* cited by examiner

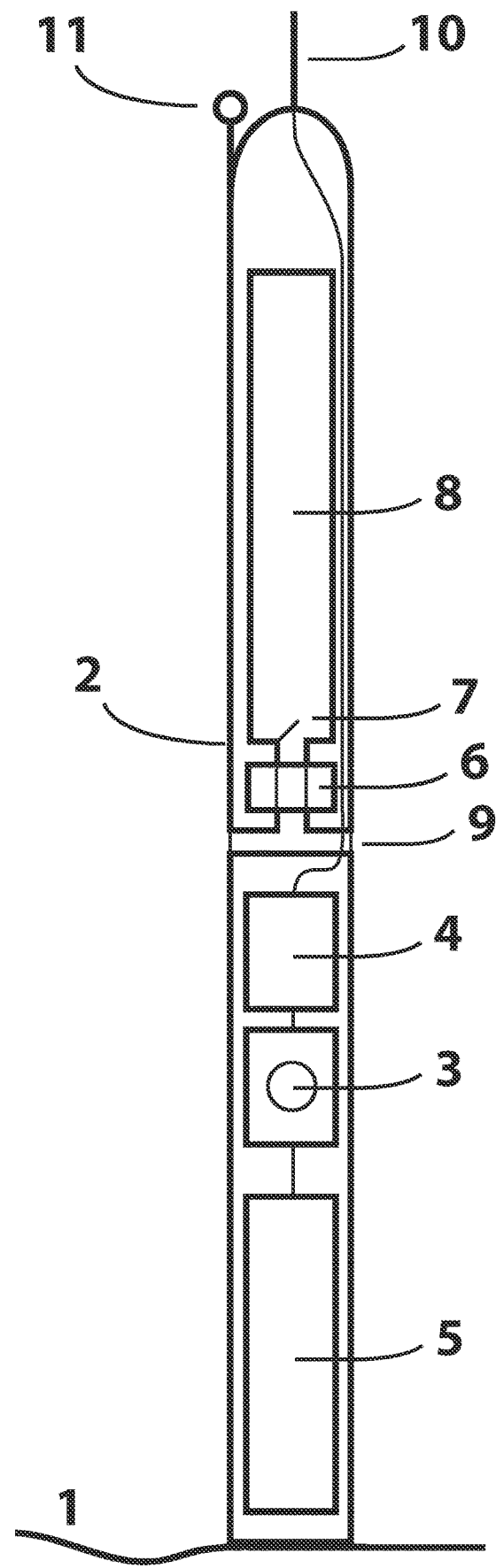

DEVICE AND A METHOD FOR DETECTION OF AND WARNING AGAINST TSUNAMIS

This application is the U.S. national phase of International Application No. PCT/SE2020/050404 filed Apr. 22, 2020 which designated the U.S. and claims priority to SE Patent Application No. 1950499-2 filed Apr. 24, 2019, the entire contents of each of which are hereby incorporated by reference.

TECHNICAL FIELD OF THE INVENTION

This invention relates especially to a method and a device for automatic detection of and warning against tsunamis, wherein the device when in use being located in the water at sea, wherein the device comprises a vessel, a sensor for measuring at least one physical quantity of the surrounding water, a control unit located inside the vessel and operatively connected to said sensor, and communication means comprising a transmitter for communicating with at least one external receiver that a predetermined condition relating to said at least one physical quantity is fulfilled.

BACKGROUND OF THE INVENTION AND PRIOR ART

A tsunami that strikes a coast is a very insidious type of natural disaster, since it is hardly noticed before it approaches land. That was the circumstances around the wave that caused death and holocaust in the Indian Ocean in December 2004. A several meter high wave that strikes a coast, needs to be just a few decimeters high as long as it travels over the deep sea. Since the wave at the same time may have a wavelength of several kilometers, is it not detectable without instruments.

Such instruments are developed. By measuring the variations of the water level, or of the water pressure at great depths, a passing tsunami may be detected. In the Pacific Ocean a system of such measuring points reports via buoys and satellites to a surveillance centre that may determine the size and travel direction of the tsunami and send out a warning to the threatened areas.

However, during the time, which is needed to detect, analyze and warn against a tsunami, the same manage to travel a considerable distance, since its speed over the deep sea may amount to over 800 km/h. This implies that communities located close to the triggering quake are not warned in time. There are also local tsunamis that are not caught in a scattered large scale surveillance system as the one around the Pacific Ocean. Such a tsunami stroke New Guinea in 1998 and such a tsunami stroke Java on 22 Dec. 2018.

Another problem is to get the transmitted warning out to the people that for the moment are in the danger zone quickly enough.

These large scale "early warning systems" have their natural role, but in addition to this there are needed local tsunami warning systems that may detect a tsunami approaching the coast and quickly warn those being in the danger zone. This requires tsunami detectors, which are automatic as well as cheap. Automatic in order to be able to be connected directly to, for instance, sirens on land, and cheap in order not to get the detectors too scattered.

The equipment that is used today is based on deep sea buoys that have to be robust, carefully anchored and of high quality in order to manage the strain they are exposed to in the shape of great waves and such. This makes them quite expensive.

A local automatic tsunami detection device is previously known by the SE patent application 0500007-0. This is located on the seabed and feels the pressure change that is caused by a passing tsunami. An ascent mechanism is then activated and the device ascends to the surface. From that place a radio signal is transmitted to a receiver on land, which in turn activates an alarm, e.g. in the shape of sirens.

The drawback of this device is that the same has to be taken care of after the triggered alarm, restored in an active state and once again be placed on the seabed. Thereto, the operability may not be tested without carrying out the entire procedure.

Another tsunami detection device is described in the SE patent application 0502490-6 where a number of separate "couriers" can be released for an equal number of tsunami events.

OBJECTS AND FEATURES OF THE INVENTION

The present invention aims at providing an improved device for detection of and warning against tsunamis. It is the objects of the present invention to provide an improved automatically operating tsunami detector, which is simple, cheap and reliable, which may be part of a large scale tsunami surveillance system as well as of a local independent tsunami warning system, and which without maintenance needs may be used several times and the function of which may be tested at predetermined time intervals.

According to the invention the objects are attained by means of the initially defined method and device for detection of and warning against tsunamis having the features defined in the independent claims. Preferred embodiments of the present invention are further defined in the dependent claims.

According to the present invention there is provided a initially defined device that further comprises a ballast tank located inside the vessel, wherein the interior of the ballast tank is connected to the outside of the vessel, and a pump, when active configured to pump water from the interior of the ballast tank to the outside of the vessel, wherein the overall density of the device is greater than the density of the surrounding water when the ballast tank is filled with water, and the overall density of the device is less than the density of the surrounding water when the ballast tank is empty of water.

It is located on the seabed where it continuously measures a physical quantity, preferably the water pressure. A passing tsunami results in a characteristic change of the water pressure at the seabed. This pressure change is identified by the control unit, which operates the pump to empty the ballast tank, hereby making the device ascend to the surface. From there it transmits a radio signal that may be received, preferably on land by a receiver connected to a siren, but also by a satellite for further forwarding to a surveillance center for a larger area.

With its ballast tank emptied the vessel will have a lower density than the surrounding water, making it ascend, and by giving the vessel an elongated shape (torpedo shape) the ascending time to the surface will be minimized.

On the seabed the device may be left in peace from storms, the oxygen of the air, people who can't leave things alone and other threats. This entails that it may be made relatively small, simple and cheap.

In order to regularly be able to test that the device (and the system to which it belongs) works as intended, the control unit may have an instruction that at predetermined intervals temporarily reduce the criteria for alarm to a level at which the device also warn against the smaller or slower pressure changes that always occurs, but also for the variations in the reported measured values that are in consequence of the imperfection of the pressure sensor. After the control unit has reacted and thereby triggered an alarm, it returns to normal instructions.

SHORT DESCRIPTION OF THE APPENDED DRAWINGS

FIG. 1 disclose an illustration of the inventive device in an active state and located on the seabed 1, onto which it is located having its heavier end resting against the seabed. The device consists of a vessel 2, which accommodates the sensor 3, a control unit 4 and a power source 5 as well as a ballast tank 8, a pump 6 and a non-return valve 7. The vessel has a watertight pressure durable casing, in which there is an opening 9 for the intake and discharge of the ballast water. It also accommodates a radio transmitter 10 mounted at the upper end. Near the top of the vessel is preferably provided a lifting device 11.

DETAILED DESCRIPTION OF PREFERRED EMBODIMENTS OF THE INVENTION

Ordinary ocean waves consist of the visible wave on the surface as well as a shock wave below the surface. The increase in pressure that the passing ordinary wave creates may only be registered close under the wave. At greater depths is it calm and the variations of the water pressure are small, also during a storm.

On the contrary, a tsunami is a shock wave that propagates through the entire water body, and that therefore may be registered at great depths. When the tsunami reaches shallow water the energy is concentrated, the pressure increases and a bigger wave starts to grow.

A tsunami is thereby easier and cheaper to detect at shallow water than at deeper. This may be used by locating the detectors in close connection to banks, islands and capes that protrudes from the coast. The only demand is that it is not so shallow that the pressure change from a tsunami is not separable from the pressure change from an ordinary storm wave.

The device is located in the water at sea, and preferably when the device is in use and monitors the nature of the surrounding water the devise is standing on the seabed 1.

The device comprises a vessel 2 and a sensor 3 for measuring/monitoring at least one physical quantity of the surrounding water, preferably said physical quantity is pressure. However, it is conceivable that the sensor 3 may measure/monitor other physical quantities of the surrounding water, such as temperature or dissolved oxygen content. The vessel 2 is a watertight body configured to withstand high pressures, such as 20-30 bar.

The device comprises a control unit 4 located inside the vessel 2 and operatively connected to said sensor 3, and communication means 10 comprising a transmitter for communicating with at least one external receiver that the predetermined condition relating to said at least one physical quantity is fulfilled. The communication means 10 may also comprise a receiver, configured to receive information and/or instructions from the at least one external receiver, enabling a two-way communication between the device and the at least one external receiver.

Preferably the vessel 2 has an elongated shape having a first end and a second end opposite said first end, wherein the transmitter of the communication means 10 is preferably located at the first end of the vessel 2. Preferably, the center of gravity of the device is offset towards the second end of the vessel 2 and thereby the device will be located more or less vertical also when standing on the seabed 1. The sensor 3 is preferably arranged offset in the axial direction towards the first end of the vessel 2 in relation to the center of the vessel 2. By having the sensor 3 and the transmitter located at the upper half of the standing vessel 2, the risk of damaging or fouling these components is decreased.

It is essential that the inventive device further comprises a ballast tank 8 located inside the vessel 2, wherein the interior of the ballast tank 8 is connected to the outside of the vessel 2. Thus, the interior of the ballast tank 8 and the outside of the vessel 2 are in controllable fluid communication with each other. Thereto, the device comprises a pump 6, when active configured to pump water from the interior of the ballast tank 8 to the outside of the vessel 2, wherein the overall density of the device is greater than the density of the surrounding water when the ballast tank 8 is filled with water, and the overall density of the device is less than the density of the surrounding water when the ballast tank 8 is empty of water.

The inventive method comprises the steps of measuring at least one physical quantity of the surrounding water by means of the sensor 3, determining, in the control unit 4, whether a predetermined condition is fulfilled based on input data from said sensor 3 relating to said at least one physical quantity of the surrounding water, and when the control unit 4 has determined that the predetermined condition is fulfilled, by means of a pump 6 pumping water from the interior of a ballast tank 8 to the outside of the vessel 2 and by means of communication means 10 communicating with at least one external receiver that the predetermined condition relating to said at least one physical quantity is fulfilled. The device may be configured to send the signal first when the device is located at the water surface. The control unit 4 is configured to intermittently or continuously determine whether the predetermined condition is fulfilled.

Thus, when the ballast tank 8 is filled with water, the device will sink in the water towards the seabed 1, and when the ballast tank 8 is empty of water, the device will ascend in the water towards the water surface. It shall be pointed out that the overall density of the device will change from being greater than the surrounding water to being less than the surrounding water when the ballast tank 8 is partially filled with water.

Thus, the sensor 3 measures/monitors continuously the water pressure and transmits the measured values to the control unit/processor 4. In the control unit, according to a preferred embodiment, the current pressure is compared with a preceding measuring value. If a determined pressure change/increase is sufficiently large and sufficiently quick, the situation is classified as a passage of a dangerously large tsunami and the control unit 4 orders the pump 6 to empty the ballast tank 8. Other characteristic conditions/behavior of the water during tsunamis may be used as equivalent predetermined conditions. The predetermined condition may be constituted by exceeding of a predetermined value, which predetermined value is based on maximum pressure difference allowed during a predetermined time period.

Thus, the control unit 4 is operatively connected to the pump 6, and is configured to activate the pump 6 when a predetermined condition is fulfilled based on input data from said sensor 3 relating to said at least one physical quantity of the surrounding water.

Preferably, the center of the ballast tank 8 is arranged offset in the axial direction towards the first end of the vessel 2 in relation to the center of the vessel 2. Thereby, when the device is ascending in the water, it will go straight and when reaching the water surface the first end of the vessel 2 will protrude above the water surface.

The pump 6 may be active all the time the device shall ascend in the water and stay at the water surface, and when the pump 6 is deactivated the water will flow from the outside of the vessel 2 to the interior of the ballast tank 8 bringing the device to sink towards the seabed 1. When the external receiver has received the warning from the device, the external receiver may send a confirmation signal to the device in order to have the device sink to the seabed 1 again in order to await a new predetermined condition.

The pump 6 may be a two way pump, pumping out water from the interior of the ballast tank 8 in order to have the device to ascend in the water and pumping water into the interior of the ballast tank 8 in order to have the device sink towards the seabed 1.

According to a preferred embodiment the device further comprises a valve 7 located between the interior of the ballast tank 8 and the outside of the vessel 2, the valve 7 being in a closed state prevents water from entering the interior of the ballast tank 8 from the outside of the vessel 2 and the valve 7 being in an open state allows water to flow between the outside of the vessel 2 and the interior of the ballast tank 8. The valve 7 may be located in series with the pump 6 or may be located in parallel to the pump 6. In the disclosed embodiment the valve 7 and the pump 6 are located in series and the vessel 2 comprises an opening 9 for the intake and discharge of the ballast water.

The control unit 4 is operatively connected to the valve 7 and is configured to close the valve 7 when a predetermined condition is fulfilled based on input data from said sensor 3 relating to said at least one physical quantity of the surrounding water. It shall be pointed out that the valve 7 may be closed already when the ballast tank 8 is filled with water and the device is awaiting a tsunami.

The opening 9 shall be configured to allow water to enter the interior of the ballast tank 8 form the outside of the vessel 2, and said opening 9 is located closer to the second end of vessel 2 than the ballast tank 8. Thereby the opening 9 is located below the water surface when the device is floating at the water surface, preventing air from entering into the interior of the ballast tank 8. The device further comprises a power source 5 operatively connected to the control unit 4.

The power source 5 is preferably a battery. The device may be programmed to ascend to the water surface at regular intervals and send a signal to the external receiver that the battery must be changed, or may be programmed to ascend when the power level decrease below a predetermined value. The signal preferably comprises also location and/or identity. The power source 5 is also operatively connected to the sensor 3 and the pump 6, directly or indirectly via the control unit 4. The center of the power source 5 is preferably arranged offset in the axial direction towards the second end of the vessel 2 in relation to the center of the vessel 2, in order to offset the center of gravity of the device towards the second end.

The control unit may also analyze the measuring values by means of more advanced computational method for the purpose of getting a quicker and more reliable identification of tsunamis having a sufficient (dangerous) size.

The radio transmitter of the vessel is activated and starts to transmit. When the vessel reaches the surface the radio waves will reach the waiting external receivers. A receiver on land may in turn be directly connected to a siren that alarms the people being on the coastal region. It may also be connected to a larger tsunami warning system, and in practice it is advisable that it is connected to both. The transmitted signal may comprise more or less information. In the most elementary case it is simply constituted by a code that the receiver respond to, but it may also comprise additional information, such as identity, position, etc. The transmitter and the receiver may also communicate by using any other type of wireless signal transfer, e.g. mobile telephone technique and the frequencies used therefore.

By placing an automatic tsunami detector at just the right distance outside an inhabited and vulnerable coastal region, the people may be alarmed in time in order to seek protection, since the above described process takes considerably shorter time than the time a tsunami needs to reach land. Different devices may be located in different directions from a city/harbor in order to monitor tsunamis from different directions.

A tsunami travels with a speed that is the result of multiplying the water depth and the acceleration of gravity, and thereby extracts the square root of that product. If the tsunami detector, for instance, is located 20 km out the coast and the mean depth is 200 meters, then the traveling time of the wave to the shore is about 10 minutes. The above described alarm process is in this case about 5 minutes, which gives an advance warning time of about 5 minutes.

FEASIBLE MODIFICATIONS OF THE INVENTION

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

Like the device that is described in the SE patent application 0500007-0, this could measure other parameters than pressure, e.g. temperature, oxygen content, etc. and alarm for large changes of these. For instance, it could be part of an automatic environmental surveillance system. The control unit may be programmed in order to respond if any measuring value is exceeded or underpassed. The difference is that the current device is not consumed after an alarm, and the function of which may be routine tested, i.e. the control unit 4, at predetermined intervals, is configured to imitate that the predetermined condition is fulfilled, in order to test the device and the warning system.

The invention claimed is:

1. A device suitable for detection of and warning against tsunamis, the device when in use being located in the water at sea, wherein the device comprises:
    a vessel,
    a sensor for measuring at least one physical quantity of the surrounding water,
    a control unit located inside the vessel and operatively connected to said sensor, and
    communication means comprising a transmitter for communicating with at least one external receiver that the predetermined condition relating to said at least one physical quantity is fulfilled, a ballast tank located inside the vessel, wherein the interior of the ballast tank is connected to the outside of the vessel, and a pump, when active configured to pump water from the interior of the ballast tank to the outside of the vessel, wherein the overall density of the device is greater than the density of the surrounding water when the ballast tank is filled with water, and the overall density of the device is less than the density of the surrounding water when the ballast tank is empty of water.

2. The device according to claim 1, wherein the device further comprises:

a valve located between the interior of the ballast tank and the outside of the vessel, the valve being in a closed state prevents water from entering the interior of the ballast tank from the outside of the vessel and the valve being in an open state allows water to flow between the outside of the vessel and the interior of the ballast tank.

3. The device according to claim 2, wherein the control unit is operatively connected to the pump and to the valve, and is configured to activate the pump when a predetermined condition is fulfilled based on input data from said sensor relating to said at least one physical quantity of the surrounding water and thereafter to close the valve.

4. The device according to claim 3, wherein the communication means comprises a receiver, configured to receive information and/or instructions from the at least one external receiver, enabling a two-way communication between the device and the at least one external receiver.

5. The device according to claim 1, wherein the device further comprises:

a power source operatively connected to the control unit.

6. The device according to claim 1, wherein the vessel has an elongated shape having a first end and a second end opposite said first end, and wherein the center of the ballast tank is arranged offset in the axial direction towards the first end of the vessel in relation to the center of the vessel.

7. The device according to claim 6, wherein the vessel comprises an opening configured to allow water to enter the interior of the ballast tank from the outside of the vessel, and wherein said opening is located closer to the second end of vessel than the ballast tank.

8. The device according to claim 1, wherein said physical quantity is pressure.

9. A warning system, comprising at least one device according to claim 1 and at least one external receiver.

10. A method for detection of and warning against tsunamis, using a device located in the water at sea, wherein the device comprises:

a vessel, a sensor for measuring at least one physical quantity of the surrounding water, a control unit located inside the vessel and operatively connected to said sensor, and communication means comprising a transmitter for communicating with at least one external receiver, the method comprising the steps of:

measuring at least one physical quantity of the surrounding water by means of the sensor, determining, in the control unit, whether a predetermined condition is fulfilled based on input data from said sensor relating to said at least one physical quantity of the surrounding water, and when the control unit has determined that the predetermined condition is fulfilled, then by means of a pump pumping water from the interior of a ballast tank located inside the vessel to the outside of the vessel and by means of communication means communicating with at least one external receiver that the predetermined condition relating to said at least one physical quantity is fulfilled, wherein the overall density of the device is greater than the density of the surrounding water when the ballast tank is filled with water, causing the device to sink in the water, and wherein the overall density of the device is less than the density of the surrounding water when the ballast tank is empty of water, causing the device to ascend in the water.

11. The method according to claim 10, wherein the device, when located at the water surface, allowing water to flow from the outside of the vessel to the interior of the ballast tank by putting a valve located between the interior of the ballast tank and the outside of the vessel in an open state.

12. The method according to claim 10, wherein the control unit, at predetermined intervals, is configured to imitate that the predetermined condition is fulfilled, in order to test the device.

13. The device according to claim 2, wherein the device further comprises:

a power source operatively connected to the control unit.

14. The device according to claim 3, wherein the device further comprises:

a power source operatively connected to the control unit.

15. The device according to claim 4, wherein the device further comprises:

a power source operatively connected to the control unit.

16. The device according to claim 2, wherein the vessel has an elongated shape having a first end and a second end opposite said first end, and wherein the center of the ballast tank is arranged offset in the axial direction towards the first end of the vessel in relation to the center of the vessel.

17. The device according to claim 3, wherein the vessel has an elongated shape having a first end and a second end opposite said first end, and wherein the center of the ballast tank is arranged offset in the axial direction towards the first end of the vessel in relation to the center of the vessel.

18. The device according to claim 4, wherein the vessel has an elongated shape having a first end and a second end opposite said first end, and wherein the center of the ballast tank is arranged offset in the axial direction towards the first end of the vessel in relation to the center of the vessel.

19. The device according to claim 5, wherein the vessel has an elongated shape having a first end and a second end opposite said first end, and wherein the center of the ballast tank is arranged offset in the axial direction towards the first end of the vessel in relation to the center of the vessel.

20. The device according to claim 2, wherein said physical quantity is pressure.

* * * * *